W. A. HALL.
PROCESS FOR EXTRACTING SULFUR.
APPLICATION FILED JUNE 19, 1911.
1,083,253.
Patented Dec. 30, 1913.
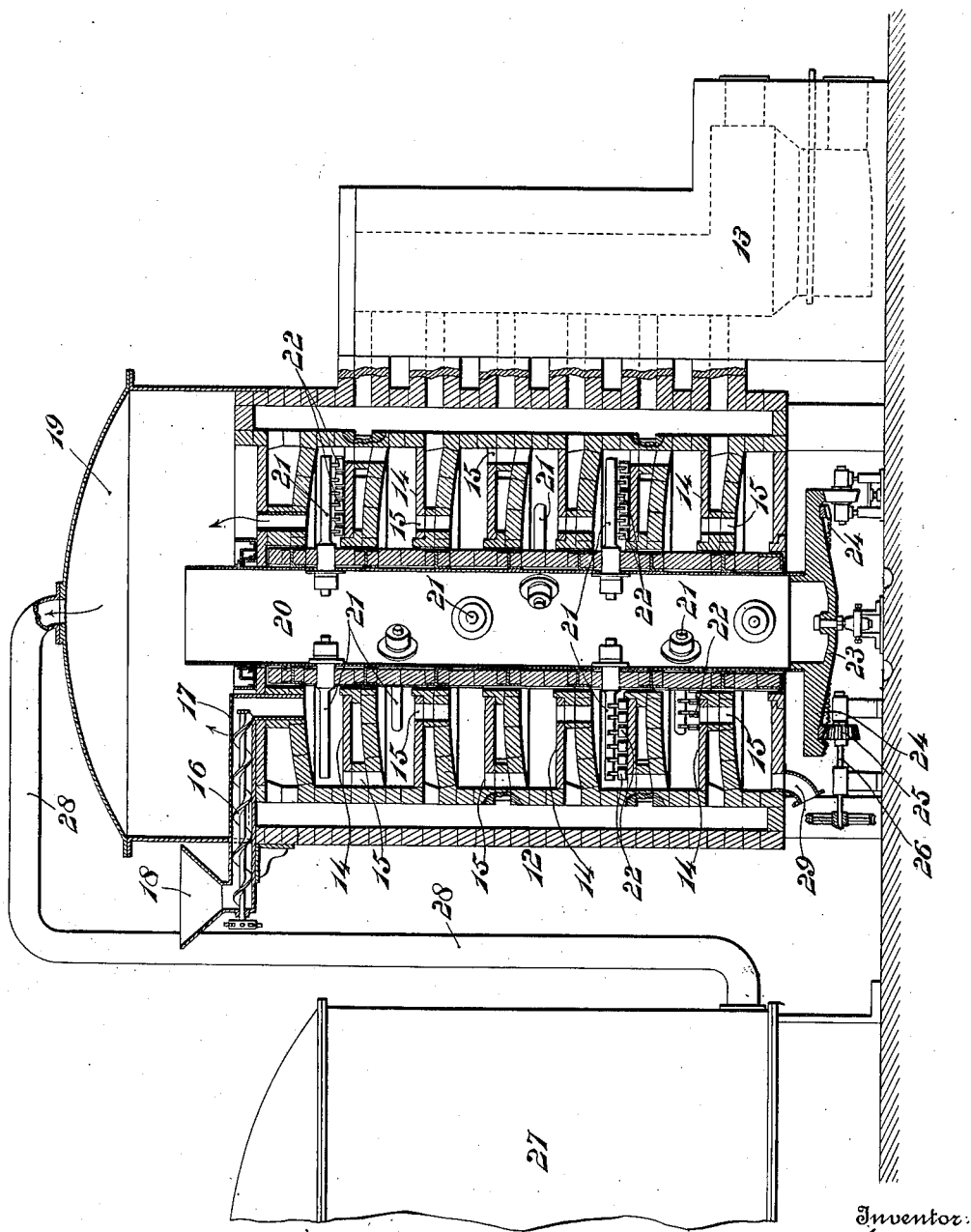

UNITED STATES PATENT OFFICE.

WILLIAM AUGUSTUS HALL, OF NEW YORK, N. Y.

PROCESS FOR EXTRACTING SULFUR.

1,083,253.   Specification of Letters Patent.   Patented Dec. 30, 1913.

Application filed June 19, 1911. Serial No. 634,070.

*To all whom it may concern:*

Be it known that I, WILLIAM A. HALL, a citizen of the United States, residing at New York, in the county of New York and State of New York, have invented or discovered certain new and useful Improvements in Processes for Extracting Sulfur, of which the following is a specification, reference being had therein to the accompanying drawing.

This invention or discovery relates to a novel process whereby sulfur may be commercially and economically extracted from iron pyrites so that it may be produced at a relatively low cost.

Iron pyrites ($FeS_2$) is not reacted upon by sulfuric acid ($H_2SO_4$) but this acid will react upon mono-sulfid of iron (FeS). In practising the present invention or discovery approximately one atom of sulfur is removed from the iron pyrites ($FeS_2$) by a continuous distillation process, and produces mono-sulfid of iron (FeS) which is then treated with sulfuric acid, thereby forming sulfureted hydrogen ($H_2S$) which contains the second atom of sulfur, and this sulfur is recovered from the sulfureted hydrogen by mixing the latter with gaseous $SO_2$ and then conducting the mixture into a salt solution, such as calcium chlorid, which separates this second atom of sulfur from the $H_2S$ by precipitating the same in the salt solution as elementary sulfur.

The accompanying drawing illustrates an apparatus by which the first part of the novel process may be carried into effect.

Referring to the drawing, 12 denotes a multiple-hearth, muffle-type, furnace which may be heated in any suitable manner, as from a heating furnace 13 preferably placed adjacent thereto. The muffle furnace 12 comprises a series of superposed shelves or hearths 14 having staggered openings 15 through which the material being treated may pass downward from one shelf or hearth to another in a circuitous path. The crushed ore may be fed to the uppermost shelf or hearth in any suitable manner, as by a rotating feed screw 16 located in a feeding tube 17 communicating with a hopper 18. The furnace 12 is suitably closed at its top, to prevent the escape of the sulfur gas into the open air, as by a hood 19.

Centrally located within the furnace 12 is a rotating shaft 20 provided with radial staggered arms 21 extending over the shelves or hearths 14. These arms will all be furnished with stirring fingers or plows 22, but for simplicity of illustration only a few of these arms are shown to be thus furnished. The shaft 20 may be rotated in any suitable manner, as by being attached to a disk 23 provided with a bevel gear 24 meshing with a pinion 25 on a rotating driving shaft 26. The chamber of the hood 19, and into which chamber the sulfur gas evolved by the roasting process will collect, communicates with a condensing tank or receptacle 27 by a pipe 28.

The operation of this apparatus, in carrying out the first part of the new process, is as follows: The crushed iron pyrites ore ($FeS_2$) is fed to the muffle furnace and as it passes downward through the same is subjected to a proper degree of heat to drive off approximately one atom of sulfur in the form of gas or vapor which passes from the chamber of the hood 19 to the chamber of the condensing tank 27, and as it cools in said tank the sulfur collects or is deposited as flowers of sulfur. The continuous stirring of the ore, as it passes downward from one shelf or hearth to another in the furnace, insures such exposure of all of the ore masses to the heat as will be sufficient to drive out all of the sulfur in the form of so-called "feeble atom" of sulfur contained in the pyrites. The ore treated as above described is finally discharged from the furnace through the spout 29, and the mono-sulfid of iron (FeS) thus discharged is then treated with sulfuric acid in a closed tank or receptacle, of any suitable construction, thus evolving the second atom of sulfur in the form of sulfureted hydrogen ($H_2S$) which is collected and mixed with gaseous $SO_2$. This $SO_2$ may be obtained by roasting mono-sulfid (FeS), or in any other suitable manner. The sulfur may then be recovered from the mixed gases by passing them into a solution of calcium chlorid, or other suitable salt, in which the sulfur is deposited by precipitation.

By the process above described commercially pure sulfur may be obtained from iron pyrites at a relatively small expense.

It will be noted that no air or other gases capable or oxidizing the ore are admitted to the muffle containing the descending pyrites, but a small amount of the products of combustion from the furnace, will, in most cases, enter through small cracks which are liable to be formed in various parts of the muffle, but since such products of combustion will ordinarily consist essentially of a mixture of $CO_2$ and nitrogen, which are inert gases in this process, they will do no harm but will aid in carrying off the vapors of sulfur to the condensing chamber.

Having thus described my invention I claim and desire to secure by Letters Patent:—

The herein described continuous process of distilling free sulfur from pyrites, which comprises heating a moving mass of pyrites in the substantial absence of materials capable of combining therewith to a temperature at which the loosely combined atom of sulfur in the pyrites is driven off, agitating said pyrites during said heating step, and continuously introducing fresh pyrites, and withdrawing the desulfurized pyrites.

In testimony whereof I affix my signature, in presence of two witnesses.

WILLIAM AUGUSTUS HALL.

Witnesses:
A. M. PERKINS,
C. M. SWEENEY.